(No Model.)

W. P. DODSON.
BROILER.

No. 255,380. Patented Mar. 21, 1882.

WITNESSES: INVENTOR

ATTORNEY

United States Patent Office.

WILSON P. DODSON, OF PHILADELPHIA, PENNSYLVANIA, ASSIGNOR TO F. HOWARD ELDRIDGE, OF SAME PLACE.

BROILER.

SPECIFICATION forming part of Letters Patent No. 255,380, dated March 21, 1882.

Application filed February 14, 1882. (No model.)

*To all whom it may concern:*

Be it known that I, WILSON P. DODSON, of the city and county of Philadelphia, and State of Pennsylvania, have invented a Broiler for Meats and other Substances, of which the following is a specification.

My invention consists in constructing a broiler of two plates, which are ribbed or corrugated, and in which on the corrugations are perforations, the purpose of the perforations being to allow the direct rays of the heat from the fire to reach the article broiled, and that of the corrugations at once to hold the exuding juices and to give a larger heating-surface, with the further advantage that they give room for the expansion and contraction incident to the use of the broiler over a hot fire, and so prevent the warping of the plates.

Figure 1:
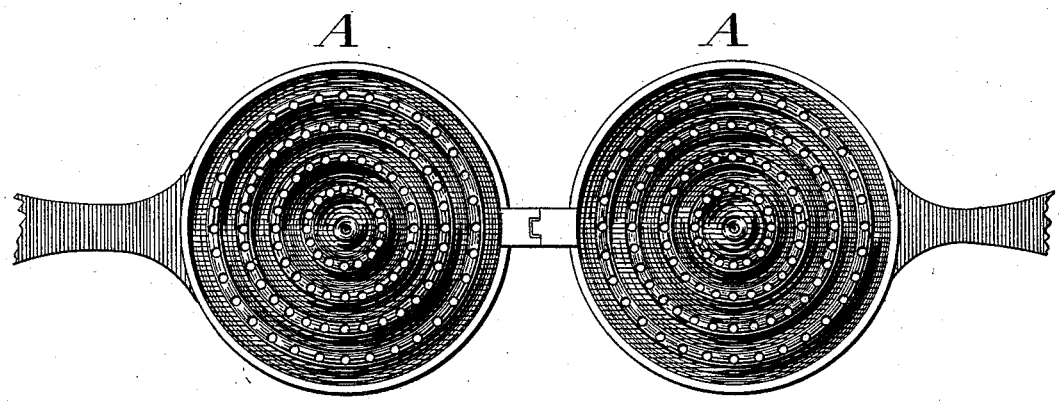
Figure 2:
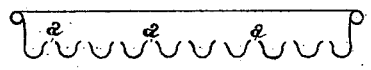

In the drawings, Figure 1 represents a broiler, constructed according to my plan, of two plates, A A, with the plates open. Fig. 2 is a vertical cross-section of a plate, showing the corrugations with the holes $a$ in the tops of them.

The meat is placed in one of the plates and the other is closed upon it, and the broiler is put over the fire. The juices from the meat then fall into the grooves of the corrugations, and are there retained. The broiler being turned over, these juices fall upon the meat and are absorbed in it, and the same action takes place on the other side, and so on until the meat is cooked.

I claim as my invention—

1. A broiler consisting of two corrugated plates, in which are perforations in the upper part of the corrugations, substantially as and for the purpose set forth.

2. The corrugated plates A A, in which are perforations in the upper part of the corrugations, substantially as described, and for the purpose set forth.

WILSON P. DODSON.

Witnesses:
WM. B. COOPER,
SAML. P. HANSON.